US008407186B1

(12) United States Patent
Cremelie et al.

(10) Patent No.: US 8,407,186 B1
(45) Date of Patent: *Mar. 26, 2013

(54) SYSTEMS AND METHODS FOR DATA-SELECTION-SPECIFIC DATA DEDUPLICATION

(75) Inventors: Nick Cremelie, Gent (BE); Bastiaan Stougie, Melle (BE)

(73) Assignee: Symantec Corporation, Mountain View, CA (US)

( * ) Notice: Subject to any disclaimer, the term of this patent is extended or adjusted under 35 U.S.C. 154(b) by 220 days.

This patent is subject to a terminal disclaimer.

(21) Appl. No.: 12/415,876

(22) Filed: Mar. 31, 2009

(51) Int. Cl.
*G06F 17/00* (2006.01)

(52) U.S. Cl. .................... 707/664; 707/637; 707/640

(58) Field of Classification Search .................. None
See application file for complete search history.

(56) References Cited

U.S. PATENT DOCUMENTS

| | | | |
|---|---|---|---|
| 7,814,149 B1* | 10/2010 | Stringham | 707/637 |
| 8,041,907 B1* | 10/2011 | Wu et al. | 707/637 |
| 8,082,228 B2* | 12/2011 | Mu | 707/650 |
| 8,095,530 B1* | 1/2012 | Lloyd | 707/640 |
| 8,108,353 B2* | 1/2012 | Balachandran et al. | 707/664 |
| 8,136,025 B1* | 3/2012 | Zhu et al. | 707/640 |
| 8,204,868 B1* | 6/2012 | Wu et al. | 707/664 |
| 2004/0187075 A1* | 9/2004 | Maxham et al. | 715/511 |
| 2006/0095470 A1* | 5/2006 | Cochran et al. | 707/104.1 |
| 2010/0114833 A1* | 5/2010 | Mu | 707/664 |
| 2010/0171993 A1* | 7/2010 | Longobardi et al. | 358/403 |
| 2010/0250858 A1* | 9/2010 | Cremelie et al. | 711/136 |
| 2010/0287466 A1* | 11/2010 | Ravid et al. | 715/256 |

OTHER PUBLICATIONS

Bartiomierj Romanski, Anchor-Driven Subchunk Deduplication, 2011, ACM, 13 pages, <URL: http://delivery.acm.org/10.1145/1990000/1987837/a16-romanski.pdf>.*

Nagapramod mandagere, Demystifying Data Deduplication, 2008, ACM, 6 pages, <URL: http://delivery.acm.org/10.1145/1470000/1462739/p12-mandagere.pdf>.*

Luis Marques, Secure Deduplication on Mobile Devices, 2011, ACM, 7 pages, <URL: http://delivery.acm.org/10.1145/2020000/2016721/p19-marques.pdf>.*

Michael Vrable, Cumulus: Filesystem Backup to the Cloud, 2009, ACM, 28 pages, <URL: http://delivery.acm.org/10.1145/1630000/1629084/a14-vrable.pdf>.*

Fanglu Guo, Building a High-performance Deduplication System, 2011, Google Scholar, 14 pages, <URL: http://static.usenix.org/event/atc11/tech/final_files/GuoEfstathopoulos.pdf>.*

Jyoti Malhotra, A Review of Various Techniques and Approaches of Data Deduplication, 2012, Google Scholar, 8 pages, <URL: http://www.ijep.net/wp-content/themes/BluePress/uploads/1334047514.pdf>.*

U.S. Appl. No. 12/415,861, filed Mar. 31, 2009, Cremelie, Nick.
U.S. Appl. No. 12/415,847, filed Mar. 31, 2009, Cremelie, Nick.

(Continued)

*Primary Examiner* — Thuy Dao
*Assistant Examiner* — Hua Lu
(74) *Attorney, Agent, or Firm* — ALG Intellectual Property, LLC

(57) ABSTRACT

A computer-implemented method for data-selection-specific data deduplication associated with a single-instance-storage computing subsystem may comprise: 1) detecting a request to store a data selection to the single-instance-storage computing subsystem, 2) identifying a data-selection-specific fingerprint set associated with the data selection and stored on a storage device, and 3) utilizing the data-selection-specific fingerprint set associated with the data selection for data deduplication associated with the request to store the data selection to the single-instance-storage computing subsystem. Other exemplary data deduplication methods, as well as corresponding exemplary systems and computer-readable media, are also disclosed.

19 Claims, 10 Drawing Sheets

OTHER PUBLICATIONS

"Cache Purging and Seeding . . ."; (accessed May 15, 2009); Toolbox for IT Groups.

Non-Final Office Action Received in U.S. Appl. No. 12/415,847; Mar. 31, 2011.

Non-Final Office Action Received in U.S. Appl. No. 12/415,861; Apr. 29, 2011.

Notice of Allowance received in related U.S. Appl. No. 12/415,861; Jul. 19, 2011.

* cited by examiner

SYSTEMS AND METHODS FOR DATA-SELECTION-SPECIFIC DATA DEDUPLICATION

BACKGROUND

Data deduplication is a technique that is used to reduce the amount of storage space used in a single-instance data storage system by detecting and preventing redundant copies of data from being stored to the single-instance data storage system. For example, data deduplication is often used to reduce the amount of storage space needed to maintain backups of an organization's data.

In order to perform data deduplication, a system needs to be able to identify redundant copies of the same data. Because of the processing requirements involved in comparing each incoming unit of data with each unit of data that is already stored in a single-instance data storage system, the detection is usually performed by the system generating and comparing smaller data signatures ("fingerprints") of each data unit instead of comparing the data units themselves. The detection generally involves generation of a new fingerprint for each unit of data to be stored to the single-instance data storage system and comparison of the new fingerprint to existing fingerprints of data units already stored by the single-instance data storage system. If the new fingerprint matches an existing fingerprint, a copy of the unit of data is likely already stored in the single-instance data storage system.

Existing data deduplication techniques often require significant computing resources, especially for single-instance data storage systems storing large amounts of data and/or for requests to store large volumes of data to a single-instance data storage system. For example, existing client-side data deduplication techniques often use significant bandwidth resources to transport large numbers of fingerprint queries from a client-side device to a server-side single instance data storage system. In addition, significant client-side memory and/or processing resources may be required for existing client-side data deduplication techniques.

SUMMARY

As will be described in greater detail below, the instant disclosure generally relates to systems and methods for data-selection-specific data deduplication. In one example, a method for performing such a task may comprise: 1) detecting a request to store a data selection to the single-instance-storage computing subsystem, 2) identifying a data-selection-specific fingerprint set associated with the data selection and stored on a storage device, and 3) utilizing the data-selection-specific fingerprint set associated with the data selection for data deduplication associated with the request to store the data selection to the single-instance-storage computing subsystem. Other exemplary data deduplication methods, as well as corresponding exemplary systems and computer-readable media, are also disclosed.

In some examples, a separate fingerprint set (e.g., a fingerprint cache) may be created and maintained for each data selection stored to a single-instance-storage subsystem. Each data-selection-specific fingerprint set may be updated so as to represent a most recent storage (e.g., backup) of the corresponding data selection to the single-instance-storage subsystem. When a request to store a data selection to the single-instance-storage subsystem is detected, the data-selection-specified fingerprint set associated with the data selection may be identified and utilized for data deduplication operations related to the fulfilling the request. For instance, the fingerprints in the data-selection-specific fingerprint set associated with the data selection may be searched and used to determine which, if any, data segments in the data selection are not already stored in the single-instance-storage subsystem. Any identified data segments may then be stored to the single-instance-storage subsystem. The data-selection-specific fingerprint set associated with the data selection may be updated so as to continue to represent the most recent storage (e.g., backup) event for the data selection.

By proceeding in this or a similar manner, the exemplary systems and methods described herein may reduce the demands on computing resources associated with data deduplication as compared to existing data deduplication techniques. For example, as described in more detail further below, a data-selection-specific fingerprint set may be efficient at least because it will generally have a high hit rate and low initialization overhead as compared to generic fingerprint caches.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
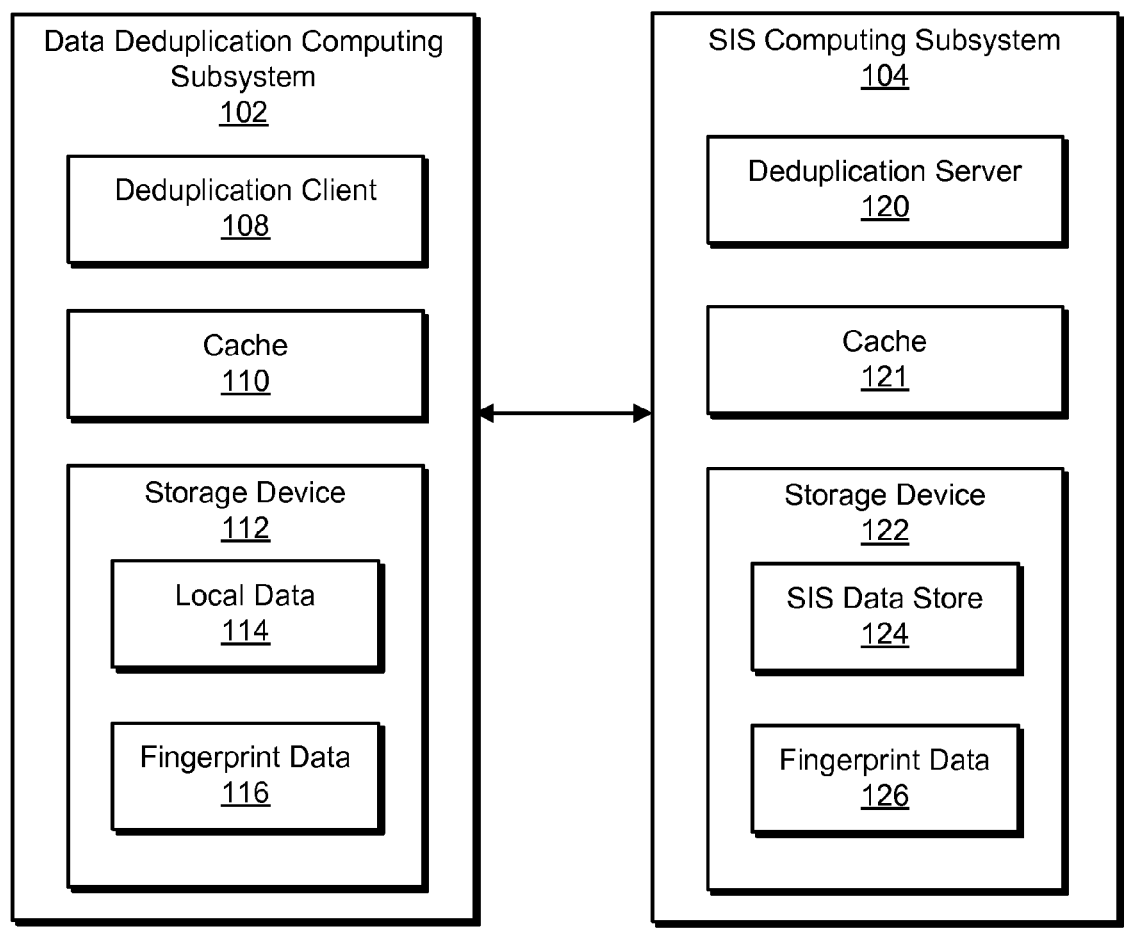
FIG. 1 is a block diagram of an exemplary system for data-selection-specific data deduplication according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for data-selection-specific data deduplication. As used herein, "data-selection-specific data deduplication" may refer to one or more operations targeted to a particular data selection and related to reducing the amount of storage space used in a single-instance data storage system, including operations for detecting and preventing data included in the particular data selection from being redundantly stored to the single-instance data storage system. A "data selection" may include a logical data set, such as a logical data set defined and marked for storage (e.g., backup) to a single-instance data storage system. As an example, a user of a client device may provide input defining and marking various selections of local data stored on the client device for storage (e.g., backup) to a single-instance data storage system. As will be described in greater detail herein, data-selection-specific data deduplication operations may be performed to selectively store the data selections to the single-instance data storage system in a manner that maintains the single-instance nature of the single-instance data storage system.

The following will provide, with reference to FIGS. 1-3, 5, and 8, detailed descriptions of exemplary systems for data-selection-specific data deduplication. Detailed descriptions of corresponding computer-implemented methods of data-selection-specific data deduplication will be provided in connection with FIGS. 4, 6, and 7. In addition, detailed descriptions of an exemplary computing system and network architecture capable of implementing one or more of the embodiments described herein will be provided in connection with FIGS. 9 and 10, respectively.

FIG. 1 is a block diagram of an exemplary system 100 for data-selection-specific data deduplication. As illustrated in this figure, exemplary system 100 may comprise a data deduplication computing subsystem 102 in communication with a single-instance-storage (SIS) computing subsystem 104. In at least one embodiment, and as will be described in greater detail below, data deduplication computing subsystem 102 may include a deduplication client 108, cache 110, and storage device 112 storing local data 114 and fingerprint data 116. In addition, SIS computing subsystem 104 may include a deduplication server 120, cache 121, and storage device 122 including a single-instance-storage (SIS) data store 124 and fingerprint data 126.

SIS computing subsystem 104, or one or more components of SIS computing subsystem 104, may include or be implemented as hardware, computing instructions (e.g., software) embodied on at least one computer-readable medium, or a combination thereof. In one embodiment, for example, SIS computing subsystem 104, or one or more components of SIS computing subsystem 104, may include or be implemented on one or more server devices configured to communicate over a network.

Data deduplication computing subsystem 102, or one or more components of data deduplication computing subsystem 102, may include or be implemented as hardware, computing instructions (e.g., software) embodied on at least one computer-readable medium, or a combination thereof. In one embodiment, for example, data deduplication computing subsystem 102, or one or more components of data deduplication computing subsystem 102, may include or be implemented on one or more client computing devices configured to communicate over a network.

Data deduplication computing subsystem 102 and SIS computing subsystem 104 may communicate with one another using any suitable data communication protocols, media, and technologies. In at least one embodiment, data deduplication computing subsystem 102 and SIS computing subsystem 104 may communicate directly with one another. In at least one other embodiment, data deduplication computing subsystem 102 and SIS computing subsystem 104 may communicate with one another indirectly, such as via a network.

Figure 2:
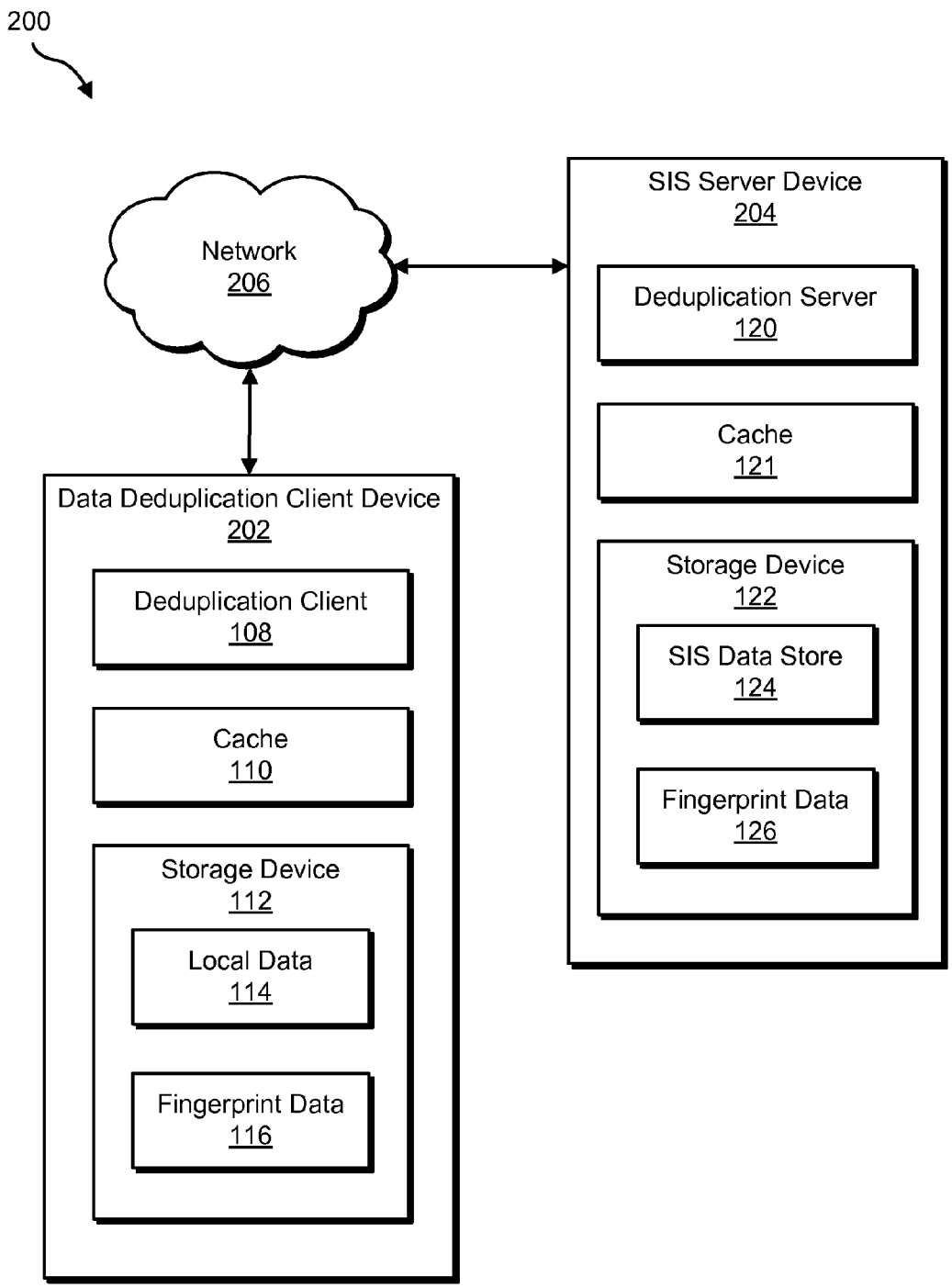
FIG. 2 is a block diagram of an exemplary implementation of the system of FIG. 1 according to at least one embodiment.

FIG. 2 is a block diagram of an exemplary implementation 200 of exemplary system 100. As illustrated in this figure, data deduplication computing subsystem 102 may include or be implemented on a data deduplication client device 202. In addition, SIS computing subsystem 104 may include or be implemented on a single-instance-storage (SIS) server device 204. Data deduplication client device 202 and SIS server device 204 may be in communication with one another via a network 206.

Network 206 generally represents any medium or architecture capable of facilitating communication or data transfer. Examples of network 206 include, without limitation, an intranet, a wide area network (WAN), a local area network (LAN), a personal area network (PAN), the Internet, power line communications (PLC), a cellular network (e.g., a GSM network), exemplary network architecture 1000 in FIG. 10, or the like. Network 206 may facilitate communication or data transfer between data deduplication client device 202 and SIS server device 204.

SIS server device 204 may include any type or form of server-side computing device capable of reading computer-executable instructions and performing one or more of the server-assisted deduplication operations and/or single-instance data storage operations described herein. Examples of SIS server device 204 include, without limitation, laptops, desktops, servers, combinations of one or more of the same, exemplary computing system 910 in FIG. 9, or any other suitable computing device configured to perform one or more of the server-assisted deduplication operations and/or single-instance data storage operations described herein.

Data deduplication client device 202 may include any type or form of client-side computing device capable of reading computer-executable instructions and performing one or more of the client-side data deduplication operations described herein. Examples of data deduplication client device 202 include, without limitation, laptops, desktops, cellular phones, personal digital assistants (PDAs), multimedia players, embedded systems, combinations of one or more of the same, exemplary computing system 910 in FIG. 9, or any other suitable computing device configured to perform one or more of the data deduplication operations described herein.

Returning to FIG. 1, components of data deduplication computing subsystem 102 and SIS computing subsystem 104 will now be described in more detail. As mentioned above, SIS computing subsystem 104 may include storage device 122, which generally represents any type or form of data storage device and/or medium (e.g., a computer-readable storage medium), such as the storage devices illustrated and described in connection with FIGS. 9 and 10. Storage device 122 may include SIS data store 124, which may comprise one or more collections of single-instance data, such as a single-instance database, for example. As used herein, "single-instance data" generally refers to non-duplicative data. Hence, SIS data store 124 may be configured to store only non-redundant instances of data.

SIS computing subsystem 104 may be configured to generate, update, and otherwise maintain fingerprint data 126 in storage device 122. The fingerprint data 126 may include one or more fingerprints associated with instances of data stored in SIS data store 124. Each fingerprint may comprise a signature or other identifier corresponding to and useful for identifying a particular instance of data stored in SIS data store 124. SIS computing subsystem 104 may generate and add the fingerprints to the fingerprint data 126 in conjunction with storage of the corresponding data instances to the SIS data store 124. SIS computing subsystem 104 may update the fingerprint data 126 by, for example, adding and/or deleting fingerprints in conjunction with storage and/or deletion of corresponding data instances in the SIS data store 124. SIS computing subsystem 104 may generate fingerprints representative of data instances in any suitable way, including, without limitation, by using a hash, checksum, or fingerprint generation heuristic.

Figure 3:
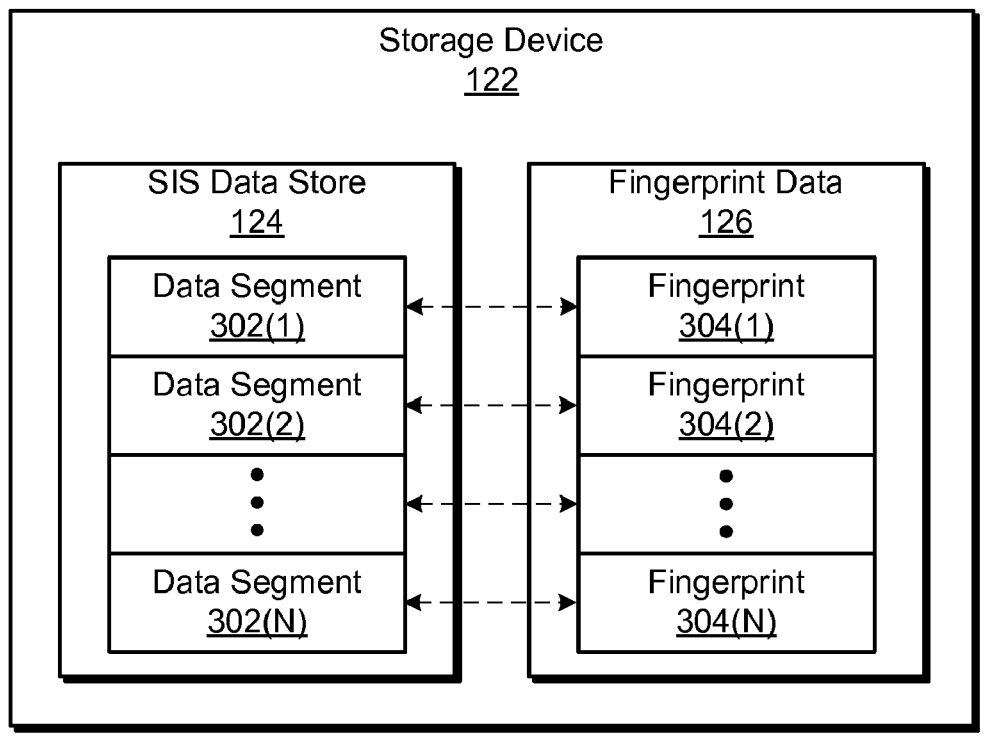
FIG. 3 is a block diagram of exemplary data segments stored to a single-instance-storage (SIS) data store according to at least one embodiment.

FIG. 3 is a block diagram illustrating exemplary data segments 302 (e.g., data segments 302(1) through 302(N)) stored in SIS data store 124 and fingerprints 304 (e.g., fingerprints 304(1) through 304(N)) included in the fingerprint data 126 and corresponding to the data segments 302. A data segment 302 generally represents any type or form of a discrete instance of data, such as a data cluster. In conjunction with SIS computing subsystem 104 storing a data segment (e.g., data segment 302(1)) to SIS data store 124, SIS computing subsystem 104 may generate and add a corresponding fingerprint (e.g., fingerprint 304(1)) in the fingerprint data 126. Thereafter, in conjunction with subsequent requests to store data to the SIS data store 124, SIS computing subsystem 104 may use the fingerprint and any other fingerprints in the fingerprint data 126 for server-assisted deduplication, including determining whether data segments in the data are already stored in the SIS data store 124.

Figure 4:
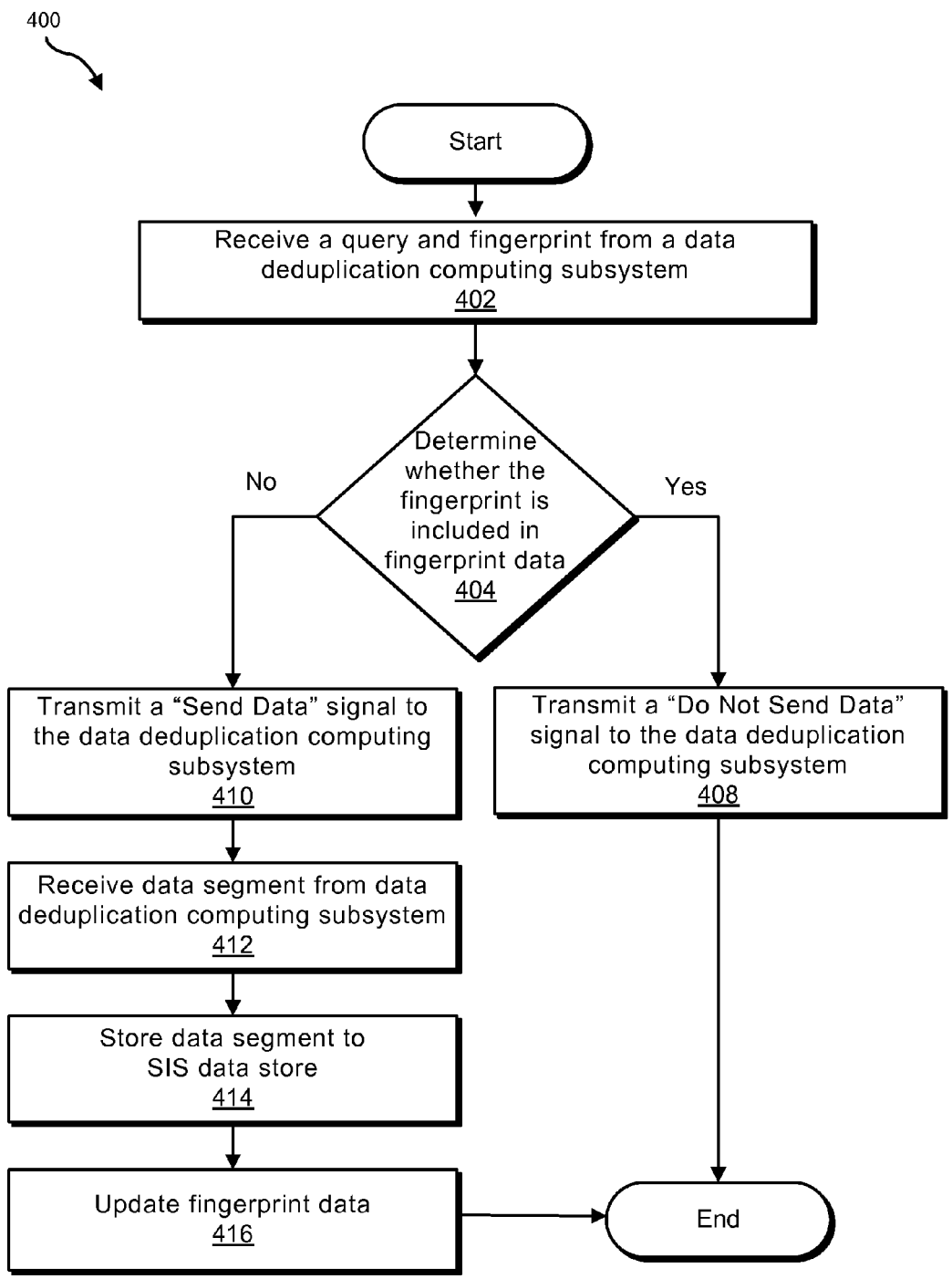
FIG. 4 is a flow diagram of an exemplary server-assisted deduplication method according to at least one embodiment.

For example, FIG. 4 is a flow diagram of an exemplary server-assisted deduplication method 400. While FIG. 4 illustrates exemplary steps according to one embodiment, other embodiments may omit, add to, reorder, and/or modify any of the steps shown in FIG. 4.

As illustrated in FIG. 4, at step 402 a query and fingerprint may be received from a data deduplication computing subsystem. For example, SIS computing subsystem 104 may receive data representative of the query and fingerprint from data deduplication computing subsystem 102 (e.g., over network 206). The fingerprint may correspond to a data segment, and the query may represent a request to use the fingerprint to determine whether the data segment is already included in SIS data store 124.

At step 404, a determination may be made as to whether the fingerprint is included in the fingerprint data 126. For example, SIS computing subsystem 104 may determine whether the fingerprint is included in the fingerprint data 126, such as by searching the fingerprint data 126 for a fingerprint matching the fingerprint received in step 402.

If the fingerprint is determined to be in the fingerprint data 126 at step 404, a "Do Not Send Data" signal may be transmitted to the data deduplication computing subsystem 102 at step 408. For example, in response to this determination, SIS computing subsystem 104 may automatically transmit the "Do Not Send Data" signal to the data deduplication computing subsystem 102. In response, data deduplication computing subsystem 102 will not send, and SIS computing subsystem 104 will not receive or store to the SIS data store 124, a duplicate copy of the data segment corresponding to the fingerprint. The method 400 may then end, and may be repeated for another query and fingerprint corresponding to another data segment.

On the other hand, if the fingerprint is determined not to be in the fingerprint data 126 at step 404, a "Send Data" signal may be transmitted to the data deduplication computing subsystem 102 at step 410. For example, in response to this determination, SIS computing subsystem 104 may automatically transmit the "Send Data" signal to the data deduplication computing subsystem 102. In response, data deduplication computing subsystem 102 may send the data segment corresponding to the fingerprint to the SIG subsystem 104 for storage in SIS data store 124.

At step 412, the data segment may be received from the data deduplication computing subsystem 102. For example, SIS subsystem 104 may receive the data segment (e.g., via network 206).

At step 414, the data segment may be stored to the SIS data store 124. For example, SIS computing subsystem 104 may store the data segment to the SIS data store 124.

At step 416, the fingerprint data 126 may be updated. For example, SIS computing subsystem 104 may update the fingerprint data 126 to include the fingerprint corresponding to the data segment stored to the SIS data store 124 at step 414. The method 400 may then end, and may be repeated for another query and fingerprint corresponding to another data segment.

One or more of the steps shown in FIG. 4 may be performed by one or more components of SIS computing subsystem 104, such as by deduplication server 121 executing one or more or the steps and/or directing one or more other components of SIS computing subsystem 104 to execute one or more of the steps. Deduplication server 121 may include or be implemented as hardware, computing instructions (e.g., software) embodied on at least one computer-readable medium, or a combination thereof. In at least one embodiment, for example, duplication server 121 may include a software application tangibly embodied on a computer-readable-storage medium (e.g., storage device 122) and configured to direct SIS computing subsystem 104 to perform one or more of the steps shown in FIG. 4.

In some examples, fingerprint data 126 may be loaded into cache 121 for access by duplication server 120 to search for and compare fingerprints in the fingerprint data 126. Cache 121 may represent any temporary computing memory.

Alternative or in addition to server-assisted deduplication operations, data deduplication computing subsystem 102 may perform client-side data deduplication operations related to requests to store data to SIS data store 124. In at least one embodiment, one or more of the steps shown in FIG. 4 may be performed in conjunction with one or more client-side data deduplication operations. For example, SIS computing subsystem 104 may perform one or more of the steps of FIG. 4 to verify determinations made by client-side data deduplication operations. As another example, SIS computing subsystem 104 may perform one or more steps of FIG. 4 when data deduplication computing subsystem 102 lacks information to make data deduplication determinations.

Performance of client-side data deduplication operations may help conserve server-side and/or network bandwidth resources. For example, client-side data deduplication operations may reduce the number of queries and fingerprints that are transmitted from data deduplication computing subsystem 102 to SIS computing subsystem 104 and the number of fingerprint comparisons performed by SIS computing subsystem 104. Exemplary client-side data deduplication operations will now be described with reference to exemplary components of data deduplication computing subsystem 102.

Returning again to FIG. 1, storage device 112 of data deduplication computing subsystem 102 may generally represent any type or form of data storage device and/or medium (e.g., a computer-readable storage medium), such as the storage devices illustrated and described in connection with FIGS. 9 and 10. Storage device 112 may comprise one or more storage devices that are accessible to data deduplication computing subsystem 102, including one or more store devices included within data deduplication client device 202 of FIG. 2 and/or located remotely of data deduplication client device 202 (e.g., a network attached storage (NAS) or storage area network (SAN)). As mentioned above, storage device 112 may include local data 114 and fingerprint data 116. Local data 114 may include any data stored on storage device 112 of data deduplication computing subsystem 102, including various data that is generated and/or consumed by a user of data deduplication computing subsystem 102. For example, local data 114 may include data files, media files, and executable files, such as those used to implement software applications and operating systems, as well as files that are used or generated by such executable files, including files generated by user applications (e.g., word processing programs, email programs, graphics programs, database applications, or the like) executing on data deduplication computing subsystem 102. As another example, local data 114 may include data in a registry and/or file system of a computing device.

One or more selections of data in the local data 114 may be defined and marked for storage (e.g., backup) to SIS data store 124 of SIS computing subsystem 104. Marking of a data selection included in local data 114 to SIS computing subsystem 104 is illustrative only. One or more of the operations described herein may be similarly performed for data selections received from other sources to SIS computing subsystem 104. For example, a data selection (e.g., a stream of data) may be pushed from an external source (e.g., from an external device, which may include a third-party device) to data deduplication computing subsystem 102 (e.g., over network 206) for deduplication and storage to SIS data store 124. As another example, data deduplication computing subsystem 102 may generate and provide a data selection (e.g., a data stream and/or a log file) for deduplication and storage to SIS data store 124 without the data selection first being stored in storage device 112, such that the data selection does not originate from the storage device 112.

The data selections may comprise separate logical data sets defined and marked for storage to SIS data store 124 of SIS computing subsystem 104. In at least one embodiment, one or more data selections may be defined by a user of data deduplication computing subsystem 102. To this end, data deduplication computing subsystem 102 may be configured to provide one or more tools configured to facilitate user definition and marking of data selections for storage to SIS data store 124. For example, data deduplication computing subsystem 102 may provide one or more graphical user interface tools for display to a user (e.g., on a display device 924 of computing system 810 of FIG. 8).

Accordingly, a user of data deduplication computing subsystem 102 may provide input defining and marking one or more separate data selections for storage to SIS data store 124. As an example, a user of data deduplication computing subsystem 102 may provide input defining and marking a data selection (e.g., a first user-defined logical data set in local data 114) and another data selection (e.g., a second user-defined logical data set in local data 114) for backup to SIS data store 124. Examples of such distinct data selections may include data within a "My Documents" folder, a set of digital images, data in a local registry, and a complete file system.

As used herein, "marked for storage" may refer to a past, current, and/or scheduled future events for storage of one or more data selections to SIS data store 124. For instance, a user may mark one or more data selections for current backup and/or scheduled future backup. Scheduled backup may include a one-time backup of a data selection scheduled at a future date and/or a schedule of recurring periodic backups of a data selection. For example, a user may mark a first data selection for daily backup and a second data selection for monthly backup. Data selections that have already been backed up to SIS data store 124 may remain "marked" for backup such that past backups of data selections may be used for future client-side data deduplication operations, as described further below.

Data deduplication computing subsystem 102 may be configured to assign an identifier to each defined data selection that is marked for storage to SIS computing subsystem 104. As described further below, the identifier associated with a data selection may be used for client-side data deduplication operations associated with the data selection.

Figure 5:
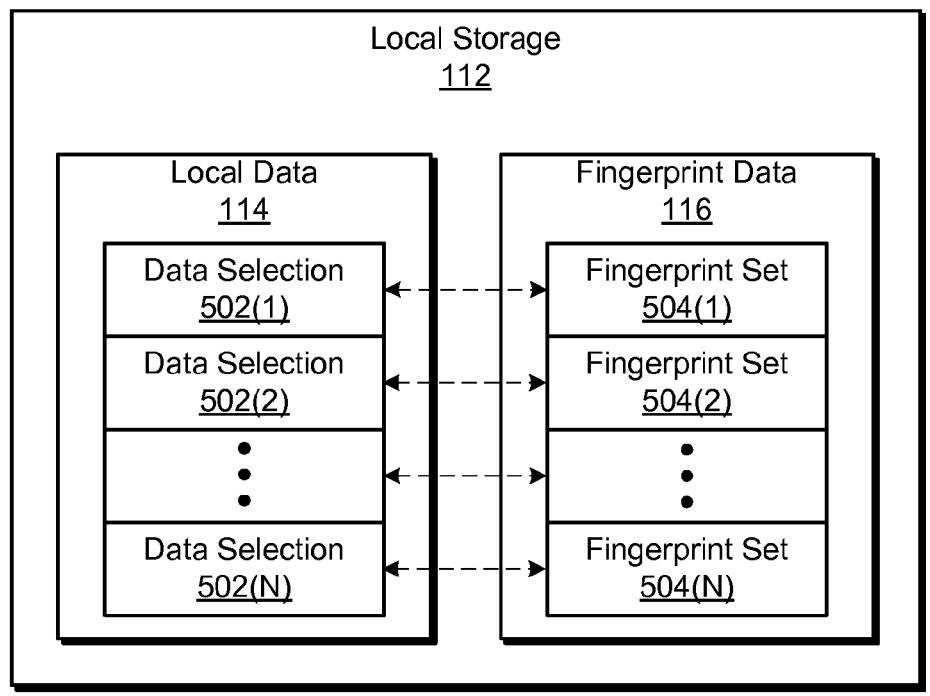
FIG. 5 is a block diagram of exemplary data selections and corresponding data-selection-specific fingerprint sets according to at least one embodiment.

FIG. 5 is a block diagram illustrating an exemplary snapshot of a plurality of distinct data selections 502 (e.g., data selections 502(1) through 502(N)) included in the local data 114 and that have been stored to SIS data store 124. Fingerprint data 116 associated with the data selections may be maintained in storage device 112 by data deduplication computing subsystem 102. As shown in FIG. 5, fingerprint data 116 in storage device 112 may comprise a plurality of data-selection-specific fingerprint sets 504 (e.g., fingerprint sets 504(1) through 504(N)) corresponding to data selections 502 that have been stored to SIS data store 124. Each of the data-selection-specific fingerprint sets 504 (or simply "fingerprint sets 504") may be associated with a separate one of the data selections 502. In the illustrated example, fingerprint set 504(1) is associated with data selection 502(1), fingerprint set 504(2) is associated with data selection 502(2), and fingerprint set 504(N) is associated with data selection 502(N).

A fingerprint set 504 may be associated with a corresponding data selection 502 in any suitable way. In at least one embodiment, for example, data deduplication computing subsystem 102 may assign the same identifier used to identify a data selection 502 to the fingerprint set 504 corresponding to the data selection 502. Accordingly, data deduplication computing subsystem 102 may use the identifiers to determine whether a fingerprint set 504 exists for a data selection 502.

Each of the fingerprint sets 504 may be maintained (e.g., created, updated, etc.) on storage device 112 and include a set of fingerprints that corresponds to a set of data segments included in the associated data selection 502 that has been stored to SIS data store 124. For example, fingerprint set 504(1) comprises a set of fingerprints that corresponds to a set of data segments included in data selection 502(1).

When a data selection 502 is originally stored to SIS data store 124, in at least one embodiment data deduplication computing subsystem 102 may create and store a fingerprint set 504 associated with the data selection 502 in storage device 112. Data deduplication computing subsystem 102 may generate fingerprints representative of data segments stored to SIS data store 124 in any suitable way, including, without limitation, by using a hash, checksum, or fingerprint generation heuristic. To maintain the integrity of fingerprint data 116 at data deduplication computing subsystem 102 with fingerprint data 126 at SIS computing subsystem 104, data deduplication computing subsystem 102 and SIS computing subsystem 104 should generate fingerprints in the same way.

When changes have been made to the data in the data selection 502 after the data selection 502 was stored to SIS data store 124, and the changed data selection 502 is subsequently stored to SIS data store 124, only the changes to the data selection 502 will be stored to SIS data store 124 such that the data selection 502 stored in the SIS data store 124 will reflect the changed data selection 502 in storage device 112. In addition, data deduplication computing subsystem 102 may update the fingerprint set 504 associated with the data selection 502 to represent changes made in the data selection 502. Hence, the fingerprint set 504 in storage device 112 may represent a most recent storage (e.g., backup) of the data selection 502 to SIS data store 124.

Accordingly, fingerprints included in a fingerprint set 504 may be used by data deduplication computing subsystem 102 for client-side data deduplication related to a data selection 502 corresponding to the fingerprint set 504, including for determining whether data segments of the data selection 502 are already stored in SIS data store 124.

Figure 6:
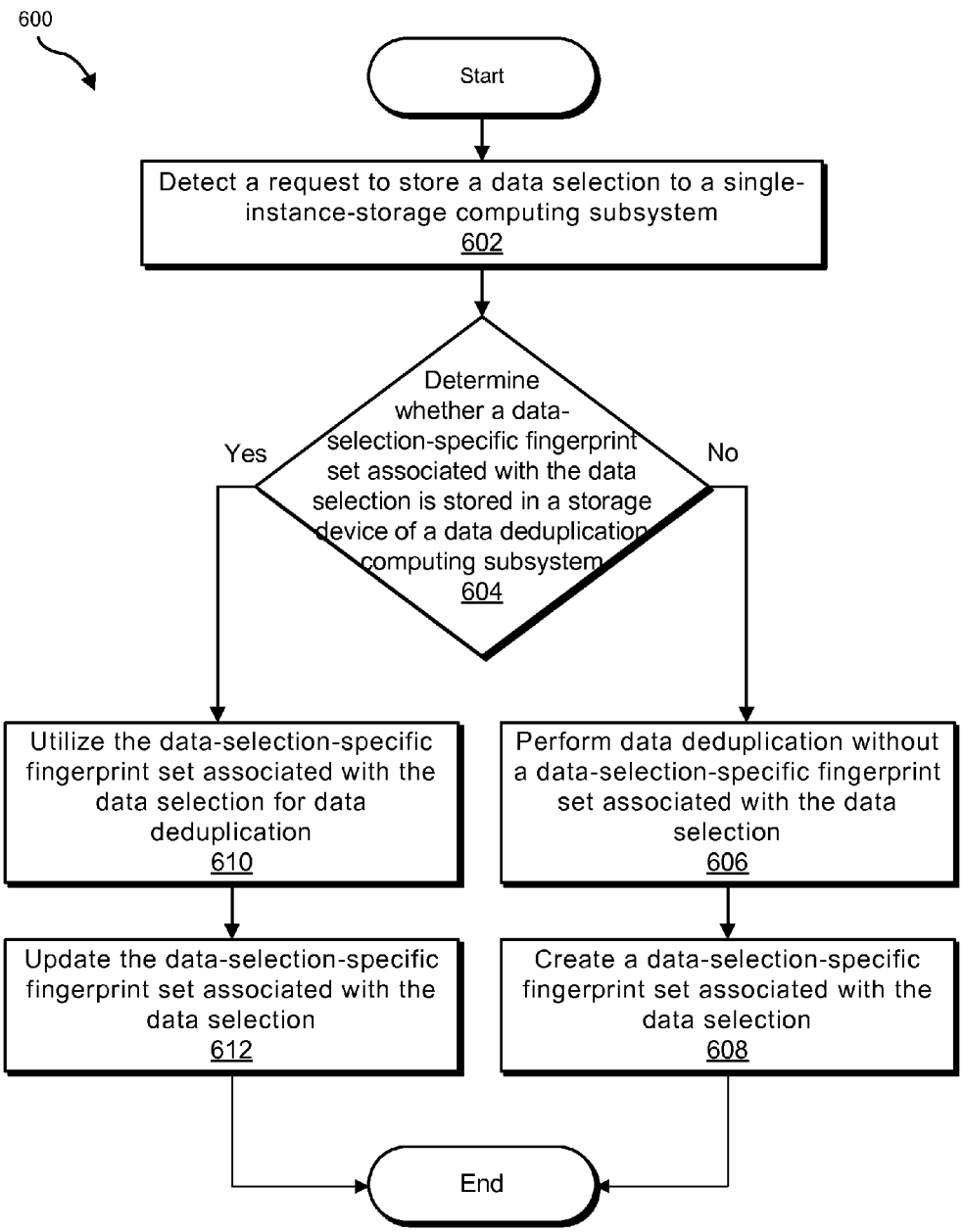
FIGS. 6-7 are flow diagrams of exemplary methods for data-selection-specific data deduplication according to at least one embodiment.
Figure 7:
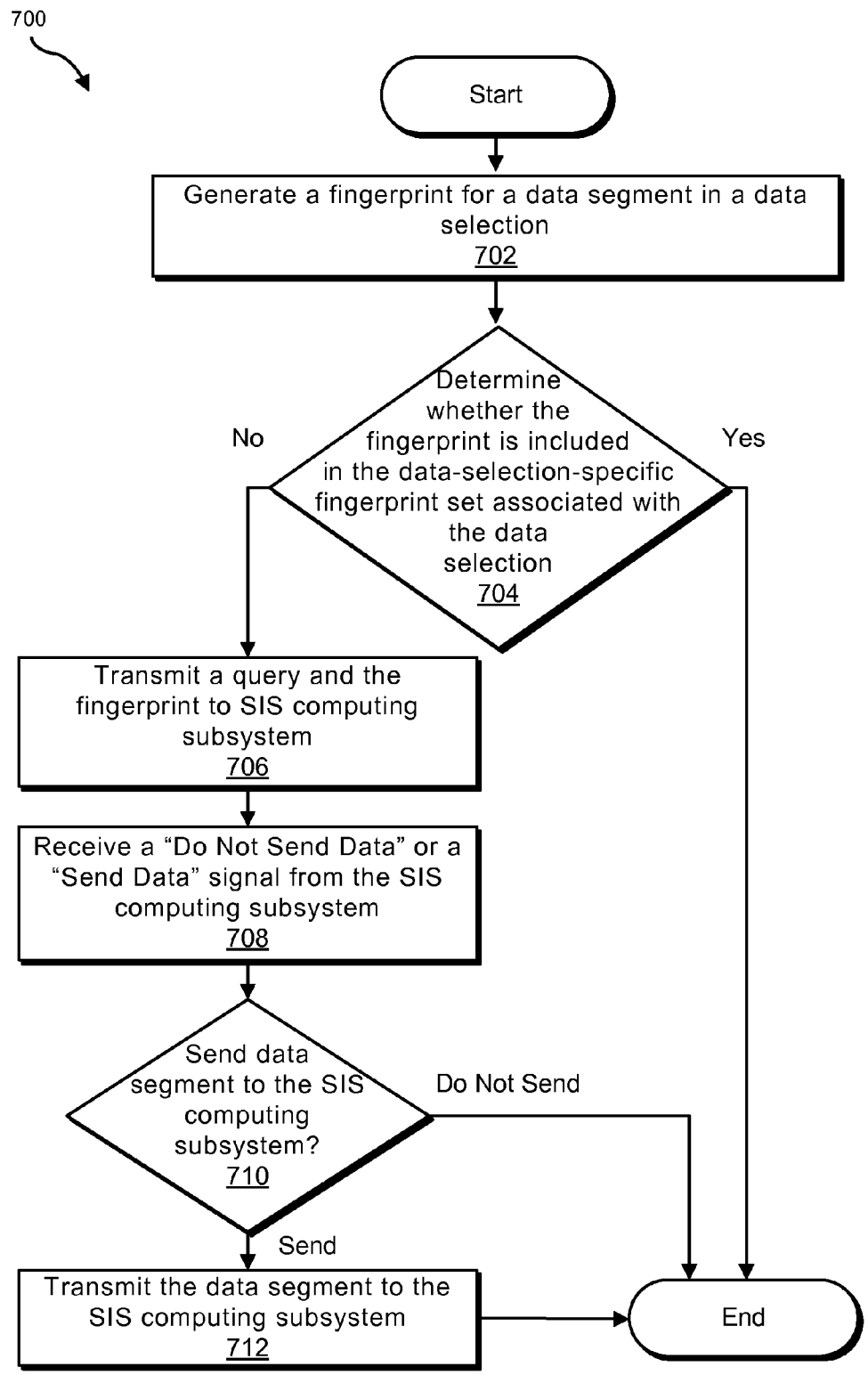

For example, FIGS. 6-7 are flow diagrams of an exemplary client-side data deduplication method 600. While FIGS. 6-7 illustrate exemplary steps according to one embodiment, other embodiments may omit, add to, reorder, and/or modify any of the steps shown in FIGS. 6-7.

As illustrated in FIG. 6, at step 602, a request to store a data selection 502 to SIS computing subsystem 104 may be detected. For example, data deduplication computing subsystem 102 may detect the request to store the data selection 502 to SIS computing subsystem 104. Data deduplication computing subsystem 102 may detect the request in any suitable way, including by detecting a predefined event, which may include receipt of user input identifying the data selection 502 and/or requesting that the data selection 502 be stored (e.g., backed up) to SIS computing subsystem 104 or initialization of a scheduled data storage (e.g., data backup) process at a predetermined time.

At step 604, a determination may be made as to whether a data-selection-specific fingerprint set 504 associated with the data selection 502 is included in the fingerprint data 116 stored on storage device 112. For example, data deduplication computing subsystem 102 may determine whether the fingerprint set 504 is included in the fingerprint data 116, such as by searching the fingerprint data 116 for an identifier associated with the fingerprint set 504 (e.g., the same identifier associated with the data selection 502).

If a fingerprint set 504 associated with the data selection 502 is determined not to be in the fingerprint data 116 at step 604, at step 606 data deduplication may be performed for the data selection 502 without a data-selection-specific fingerprint set 504 associated with the data selection 502. For example, in response to this determination, data deduplication computing subsystem 102 may automatically initiate data deduplication, which may be performed without a data-selection-specific fingerprint set 504 associated with the data selection 502. This may include data deduplication computing subsystem 102 generating one or more fingerprints for data segments included in the data selection 502 and transmitting one or more queries and fingerprints to SIS computing subsystem 104, which may perform server-assisted deduplication as described above in reference to FIG. 4. Accordingly, step 606 may also include data deduplication computing subsystem 102 selectively transmitting or not transmitting one or more data segments of the data selection 502 to SIS computing subsystem 104 based on data deduplication signals ("Send Data" and/or "Do Not Send Data" signals) received from SIS computing subsystem 104.

At step 608, a data-selection-specific fingerprint set 504 associated with the data selection 502 may be created. For example, data deduplication computing subsystem 102 may create the data-selection-specific fingerprint set 504 associated with the data selection 502 to include one or more fingerprints generated in step 606. Data deduplication computing subsystem 102 may be configured to create fingerprint set 504 to represent that associated data selection 502 as stored to SIS data store 124. As mentioned above, data deduplication computing subsystem 102 may assign an identifier to the fingerprint set 504 that facilitates identification of the fingerprint set 504 as being associated with the data selection 502. The data-selection-specific fingerprint set 504 associated with the data selection 502 may be stored to storage device 112. The method 600 may then end, and may be repeated for a subsequent request to store the same data selection 502 or for another request to store another data selection 502 to SIS computing subsystem 104.

Returning to step 604, if a data-selection-specific fingerprint set 504 associated with the data selection 502 is determined to be in the fingerprint data 116 stored in storage device 112 at step 604, the fingerprint set 504 associated with the data selection 502 may be identified and then utilized for data deduplication at step 610. An example of utilization of the identified fingerprint set 504 for data deduplication is described further below in reference to FIG. 7.

At step 612, the fingerprint set 504 associated with the data selection 502 may be updated. For example, data deduplication computing subsystem 102 may update the fingerprint set 504 to include one or more fingerprint corresponding to one or more data segments of data selection 502 stored to the SIS data store 124 at step 610. The method 600 may then end, and may be repeated for a subsequent request to store the same data selection or for another request to store another data selection to SIS computing subsystem 104.

In at least one embodiment, data deduplication computing subsystem 102 may be configured to utilize a partial data-selection-specific fingerprint set for data deduplication. For example, during an initial backup of a data selection, a data-selection-specific fingerprint set may be created at step 608 of FIG. 6. As the data-selection-specific fingerprint set is being created, it may exist in one or more partial states. Data deduplication computing subsystem 102 may utilize such a partial data-selection-specific fingerprint set during the same backup of the data selection. For instance, at the first occurrence of a data segment in the backup, a fingerprint corresponding to the data segment may be added to the data-selection-specific fingerprint set. At a subsequent occurrence of the same data segment in the same backup, the entry previously added to the data-selection-specific fingerprint set may be accessed and used for data deduplication operations. Data deduplication computing subsystem 102 may utilize such partial data-selection-specific fingerprint sets in any suitable way, such as by repeating one or more steps of method 600 (e.g., steps 604-612) for various data segments of a data selection in relation to a request to store the data selection to SIS computing subsystem 602.

FIG. 7 illustrates an exemplary method 700 of data deduplication that utilizes a data-selection-specific fingerprint set 504 associated with a data selection 502. One or more steps of method 700 may be performed one or more times at step 610 of FIG. 6. While FIG. 7 illustrates exemplary steps according to one embodiment, other embodiments may omit, add to, reorder, and/or modify any of the steps shown in FIG. 7. For example, in at least one embodiment, steps 706, 708, and 710 may be skipped or omitted from method 700.

As illustrated in FIG. 7, at step 702, a fingerprint for a data segment in a data selection 502 may be generated. For example, data deduplication computing subsystem 102 may calculate the fingerprint in any of the ways mentioned herein (e.g., (e.g., in accordance with a checksum, hash, or fingerprint generation heuristic).

At step 704, a determination may be made as to whether the fingerprint generated in step 702 is included in the fingerprint set 504 associated with the data selection 502. For example, data deduplication computing subsystem 102 may determine whether the fingerprint is included in the fingerprint set 504 associated with the data selection 502, such as by searching the fingerprint set 504 associated with the data selection for a fingerprint matching the fingerprint generated in step 702.

If the fingerprint is determined to be in the fingerprint set 504 associated with the data selection at step 704, the method 700 may end, and may be repeated for another data segment in the data selection 502. This determination may indicate that the data segment associated with the fingerprint is already stored in SIS data store 124. Accordingly, data deduplication computing subsystem 102 may not send the data segment, a query, or a fingerprint associated with the data segment to SIS computing subsystem 104. This may help reduce traffic between data deduplication computing subsystem 102 and SIS computing subsystem 104, which may help reduce demands on network bandwidth and/or processing demands at the SIS computing subsystem 104.

On the other hand, if the fingerprint is determined not to be in the fingerprint set 504 associated with the data selection 502 at step 704, at step 706 a query and the fingerprint may be transmitted to SIS computing subsystem 104. For example, data deduplication computing subsystem 102 may transmit the query and fingerprint to SIS computing subsystem 104, which may be configured to perform server-assisted deduplication based on the query and the fingerprint as described above in reference to FIG. 4, which may include transmitting a "Do Not Send Data" or a "Send Data" signal to data deduplication computing subsystem 102 based on whether SIS computing subsystem 104 determines that the data segment associated with the fingerprint is already stored in SIS data store 124.

At step 708, a "Do Not Send Data" or a "Send Data" signal may be received from the SIS computing subsystem 104. For example, data deduplication computing subsystem 102 may receive a "Do Not Send Data" or a "Send Data" signal from the SIS computing subsystem 104.

At step 710, a determination may be made as to whether to send the data segment to the SIS computing subsystem 104. For example, data deduplication computing subsystem 102 may determine whether to send he data segment to the SIS computing subsystem 104 based on the signal received from the SIS computing subsystem 104 in step 708.

If the determination at step 710 is to not send the data segment to SIS computing subsystem 104, the method 700 may end, and may be repeated for another data segment in the data selection 502. This determination may indicate that the SIS computing subsystem 104 has determined that the data segment associated with the fingerprint is already stored in SIS data store 124. Accordingly, data deduplication computing subsystem 102 may not send the data segment to the SIS computing subsystem 104. This may help reduce traffic between data deduplication computing subsystem 102 and SIS computing subsystem 104, which may help reduce demands on network bandwidth and/or processing demands at the SIS computing subsystem 104.

On the other hand, if the determination at step 710 is to send the data segment to SIS computing subsystem 104, the data segment may be transmitted to the SIS computing subsystem 104 at step 712. For example, data deduplication computing subsystem 102 may transmit the data segment to the SIS computing subsystem 104 (e.g., via network 206). The method 700 may then end, and may be repeated for another data segment in the data selection 502.

One or more of the steps shown in FIGS. 6-7 may be performed by one or more components of data deduplication computing subsystem 102, such as by deduplication client 108 executing one or more or the steps and/or directing one or more other components of data deduplication computing subsystem 102 to execute one or more of the steps. Deduplication client 108 may include or be implemented as hardware, computing instructions (e.g., software) embodied on at least one computer-readable medium, or a combination thereof. In at least one embodiment, for example, deduplication client 108 may include a software application tangibly embodied on a computer-readable-storage medium (e.g., storage device 112) and configured to direct data deduplication computing subsystem 102 to perform one or more steps shown in FIGS. 6-7.

Figure 8:
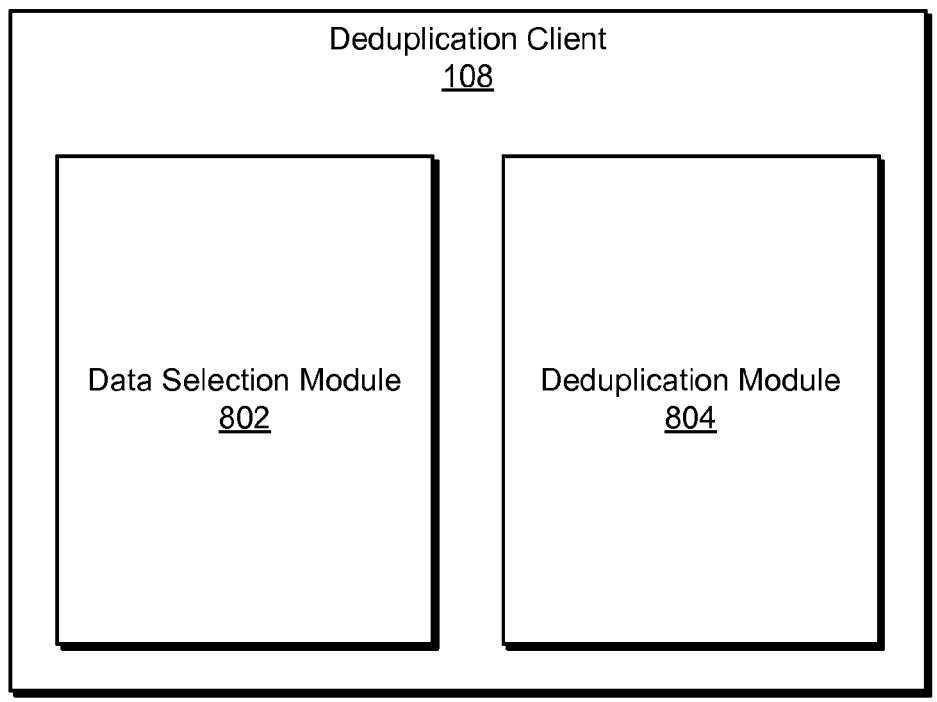
FIG. 8 is a block diagram of exemplary modules of a deduplication client according to at least one embodiment.

FIG. 8 illustrates exemplary modules that may be included in deduplication client 108 and configured to perform and/or direct one or more components of data deduplication computing subsystem 102 to perform one or more of the client-side data deduplication operations described above. The modules may be implemented in any suitable way, including as computing instructions tangibly embodied on a computer-readable-storage medium (e.g., as components of a software application). As shown in FIG. 8, deduplication client 108 may include a data selection module 802 configured to perform and/or direct one or more components of data deduplication computing subsystem 102 to perform one or more of the operations related to defining, marking, and identifying data selections 502 as described above. Deduplication client 108 may also include a deduplication module 804 configured to perform and/or direct one or more components of data deduplication computing subsystem 102 to perform one or more of the data deduplication operations described above, particularly operations related to utilizing a data-selection-specific fingerprint set 504 for data deduplication.

In some examples, utilization of a data-selection-specific fingerprint set 504 for data deduplication in step 610 of FIG. 6 may include initializing the data-selection-specific fingerprint set 504 by loading it into cache 110 for access by deduplication client 108 to search for and compare fingerprints in the fingerprint set 504. Cache 110 may represent any temporary computing memory.

One or more of the operations described above may include and/or cause transformation of data and/or at least one property of storage device 112 or storage device 122. For example, defining and/or marking one or more data selections, and/or assigning identifiers to one or more data selections as described above may include or cause transformation of data and/or at least one property of storage device 112. As another example, maintaining (e.g., creating and/or updating) one or more data-selection-specific fingerprint sets 504, and/or utilizing one or more of the data-selection-specific fingerprint sets 504 for data deduplication as described above may include or cause transformation of data and/or at least one property of storage device 112.

One or more of the methods and/or one or more of the steps in the methods described above may be repeated for subsequent requests to store the same data selection and/or one or more other data selections to SIS data store 124.

The examples of data-selection-specific data deduplication described above may provide for efficient data deduplication and may alleviate the demands placed by data deduplication on computing resources such as processing, memory storage, and/or network bandwidth resources. For example, by creating and maintaining separate, up-to-date fingerprint sets 504 for corresponding data selections 502, the demands of data deduplication operations associated with the data selections 502 may generally be less than the demands of previous data deduplication techniques.

In particular, the examples of data-selection-specific data deduplication described above may limit the queries transmitted from data deduplication computing subsystem 102 to SIS computing subsystem 104 without introducing significant overhead demands at the data deduplication computing subsystem 102. To illustrate, an up-to-date, data-selection-specific fingerprint set 504 will generally produce a high hit rate (i.e., have a high "locality") when searched for fingerprints associated with data segments in the data selection 502 corresponding to the fingerprint set 504, especially when there is a high degree of overlap between iterations of the data selection 502, such as when the data deduplication is performed for serial backups of the data selection 502 over time and only modified data in each iteration of the data selection 502 is stored to SIS data store 124. In this and other contexts, a data-selection-specific fingerprint set 504 will generally have a higher locality for a data selection 502 than would a generic fingerprint cache that is not tailored to the data selection 502.

Moreover, a generic fingerprint cache will typically have a larger memory footprint and more resource intensive initialization than a data-selection-specific fingerprint set 504. Hence, a data-selection-specific fingerprint set 504 may help reduce the resource demands (e.g., cache overhead) associated with initializing the data-selection-specific fingerprint set 504 (e.g., loading the data-selection-specific fingerprint set 504 into cache 110) as compared to initialization of a generic fingerprint cache.

The exemplary data-selection-specific data deduplication systems and methods described above may be implemented as may suit a particular application and/or environment. For example, FIG. 9 is a block diagram of an exemplary computing system 910 capable of implementing one or more of the embodiments described and/or illustrated herein. Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may comprise at least one processor 914 and a system memory 916.

Processor 914 generally represents any type or form of processing unit capable of processing data or interpreting and executing instructions. In certain embodiments, processor 914 may receive instructions from a software application or module. These instructions may cause processor 914 to perform the functions of one or more of the exemplary embodiments described and/or illustrated herein. For example, processor 914 may perform and/or be a means for performing, either alone or in combination with other elements, one or more of the receiving, determining, transmitting, storing, updating, detecting, assigning, identifying, performing, creating, maintaining, utilizing, generating, sending, comparing, initializing, and loading steps described herein. Processor 914 may also perform and/or be a means for performing any other steps, methods, or processes described and/or illustrated herein.

System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. Although not required, in certain embodiments computing system 910 may comprise both a volatile memory unit (such as, for example, system memory 916) and a non-volatile storage device (such as, for example, primary storage device 932, as described in detail below).

In certain embodiments, exemplary computing system 910 may also comprise one or more components or elements in addition to processor 914 and system memory 916. For example, as illustrated in FIG. 9, computing system 910 may comprise a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an ISA, PCI, PCIe, or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912. In certain embodiments, memory controller may perform and/or be a means for performing, either alone or in combination with other elements, one or more of the steps or features described and/or illustrated herein, such as receiving, determining, transmitting, storing, updating, detecting, assigning, identifying, performing, creating, maintaining, utilizing, generating, sending, comparing, initializing, and loading.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934. I/O controller 920 may be used, for example, to perform and/or be a means for performing, either alone or in combination with other elements, one or more of the receiving, determining, transmitting, storing, updating, detecting, assigning, identifying, performing, creating, utilizing, generating, sending, comparing, initializing, and loading steps described herein. I/O controller 920 may also be used to perform and/or be a means for performing other steps and features set forth in the instant disclosure.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network comprising additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, SCSI host adapters, USB host adapters, IEEE 994 host adapters, SATA and eSATA host adapters, ATA and PATA host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution. In certain embodiments, communication interface 922 may perform and/or be a means for performing, either alone or in combination with other elements, one or more of the receiving, determining, transmitting, storing, updating, detecting, assigning, identifying, performing, creating, utilizing, generating, sending, comparing, initializing, and loading steps disclosed herein. Communication interface 922 may also be used to perform and/or be a means for performing other steps and features set forth in the instant disclosure.

Figure 9:
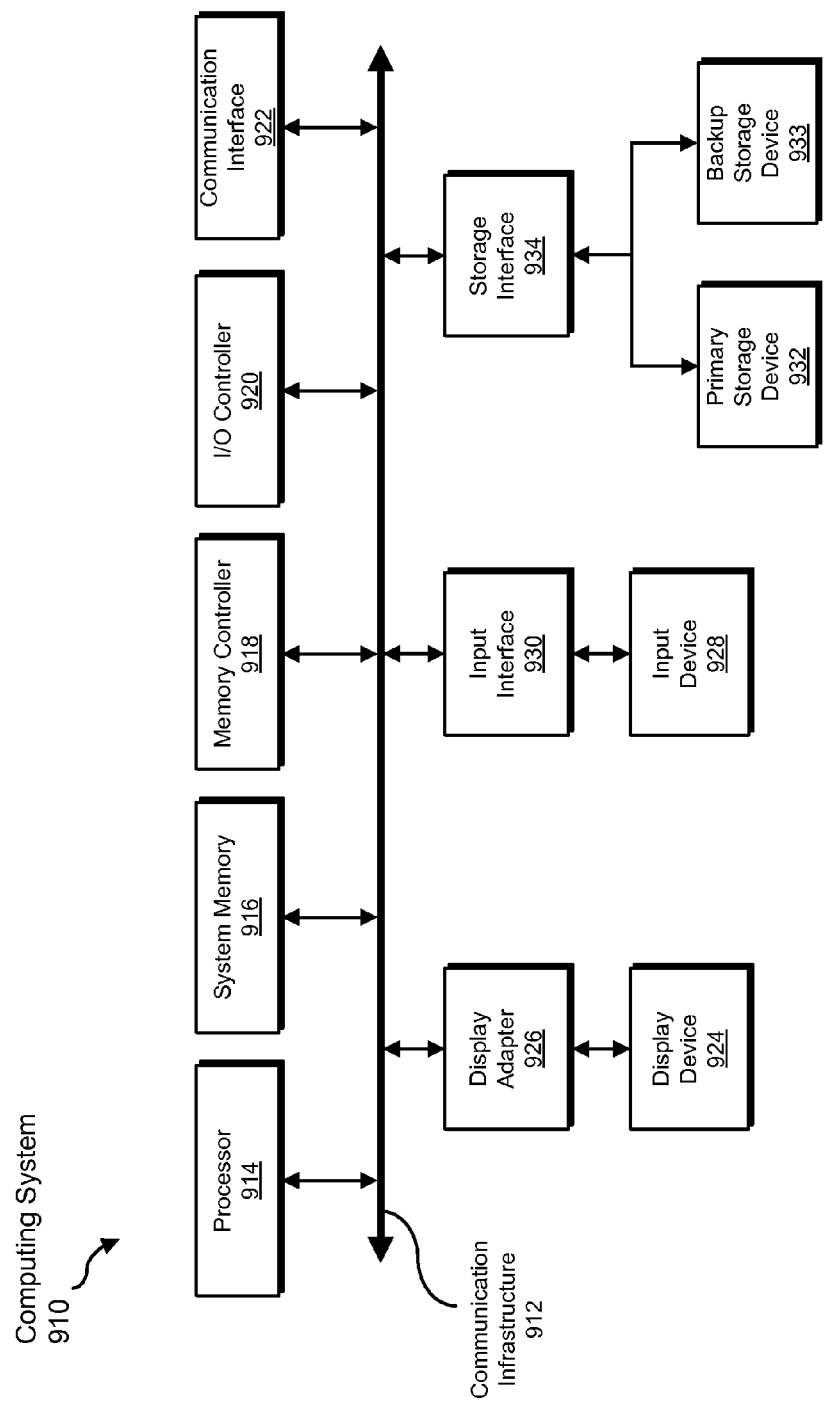
FIG. 9 is a block diagram of an exemplary computing system capable of implementing one or more of the embodiments described and/or illustrated herein.

As illustrated in FIG. 9, computing system 910 may also comprise at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also comprise at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device. In at least one embodiment, input device 928 may perform and/or be a means for performing, either alone or in combination with other elements, one or more of the receiving, determining, transmitting, storing, updating, detecting, assigning, identifying, performing, creating, utilizing, generating, sending, comparing, initializing, and loading steps disclosed herein. Input device 928 may also be used to perform and/or be a means for performing other steps and features set forth in the instant disclosure.

As illustrated in FIG. 9, exemplary computing system 910 may also comprise a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 910.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also comprise other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

In certain embodiments, storage devices 932 and 933 may be used, for example, to perform and/or be a means for performing, either alone or in combination with other elements, one or more of the receiving, determining, transmitting, storing, updating, detecting, assigning, identifying, performing, creating, utilizing, generating, sending, comparing, initializing, and loading steps disclosed herein. Storage devices 932 and 933 may also be used to perform and/or be a means for performing other steps and features set forth in the instant disclosure.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" or "computer-readable-storage medium" generally refers to any form of device, carrier, or medium capable of storing or carrying and/or storing computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an application specific integrated circuit (ASIC) adapted to implement one or more of the exemplary embodiments disclosed herein.

Figure 10:
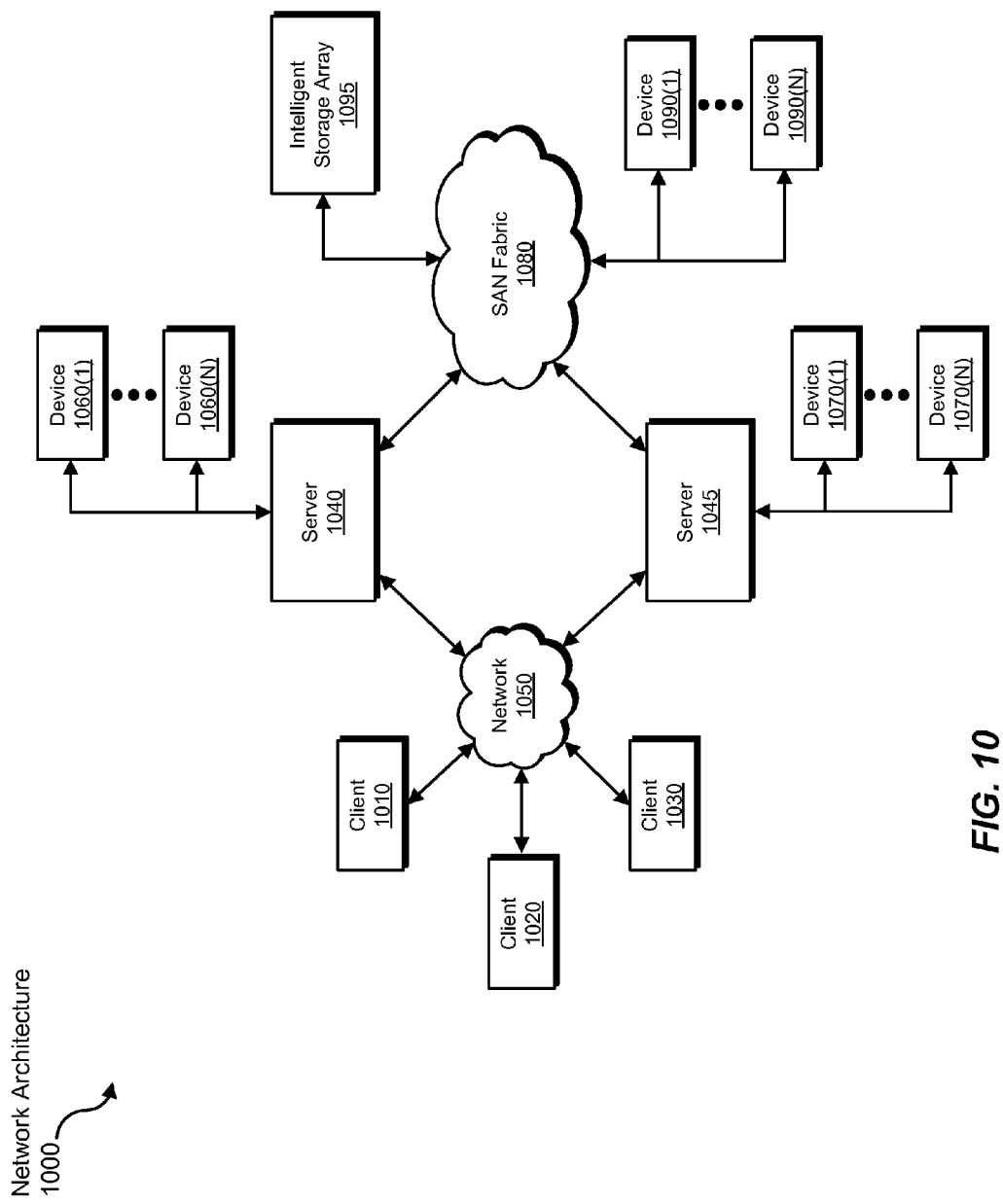
FIG. 10 is a block diagram of an exemplary computing network capable of implementing one or more of the embodiments described and/or illustrated herein.

FIG. 10 is a block diagram of an exemplary network architecture 1000 in which client systems 1010, 1020, and 1030 and servers 1040 and 1045 may be coupled to a network 1050. Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or run certain software applications. Network 1050 generally represents any telecommunication or computer network including, for example, an intranet, a wide area network (WAN), a local area network (LAN), a personal area network (PAN), or the Internet.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent network-attached storage (NAS) devices configured to communicate with servers 1040 and 1045 using various protocols, such as NFS, SMB, or CIFS.

Servers 1040 and 1045 may also be connected to a storage area network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050. Accordingly, network architecture 1000 may perform and/or be a means for receiving, determining, transmitting, storing, updating, detecting, assigning, identifying, performing, creating, utilizing, generating, sending, comparing, initializing, and loading steps disclosed herein. Network architecture 1000 may also be used to perform and/or be a means for performing other steps and features set forth in the instant disclosure.

Network architecture 1000, or another network architecture, may be used to implement one or more embodiments that include multiple deduplication servers and/or multiple SIS data stores. For example, multiple SIS data stores included in one or more data storage devices may form one logical SIS data store or separate logical SIS data stores. Additionally or alternatively, multiple deduplication servers may be in connection with one or multiple SIS data stores. In some examples, each of the deduplication servers may be responsible for a subset of data in an SIS data store. In other examples, each of the deduplication servers may be responsible for data in a separate SIS data store, and the separate SIS data stores may form one logical SIS data store. In some examples, a data deduplication computing subsystem may communicate with one or more of the deduplication servers.

As detailed above, computing system 910 and/or one or more components of network architecture 1000 may perform and/or be a means for performing, either alone or in combination with other elements, one or more steps of an exemplary method for data-selection-specific data deduplication associated with a single-instance-storage computing subsystem such as SIS computing subsystem 104. In one example, a method for performing such a task may comprise: 1) detecting a request to store a data selection to the single-instance-storage computing subsystem, 2) identifying a data-selection-specific fingerprint set associated with the data selection and stored on a storage device, and 3) utilizing the data-selection-specific fingerprint set associated with the data selection for data deduplication associated with the request to store the data selection to the single-instance-storage computing subsystem.

In some examples, the method may also comprise: 1) transmitting at least one new data segment associated with the data selection to the single-instance-storage computing subsystem for storage to a single-instance-storage data store and 2) updating the data-selection-specific fingerprint set associated with the data selection to include at least one new fingerprint representing the at least one new data segment. In addition, the method may further comprise: 1) detecting a subsequent request to store the data selection to the single-instance-storage computing subsystem, 2) identifying the updated data-selection-specific fingerprint set associated with the data selection and stored on the storage device, and 3) utilizing the updated data-selection-specific fingerprint set associated with the data selection for data deduplication associated with the subsequent request to store the data selection to the single-instance-storage computing subsystem.

In some examples, the method may also comprise: 1) detecting a request to store another data selection to the single-instance-storage computing subsystem, 2) identifying another data-selection-specific fingerprint set associated with the other data selection and stored on the storage device, and 3) utilizing the other data-selection-specific fingerprint set associated with the other data selection for data deduplication associated with the request to store the other data selection to the single-instance-storage computing subsystem.

In some examples, the method may also comprise: 1) detecting a request to store another data selection to the single-instance-storage computing subsystem, 2) determining that a data-selection-specific fingerprint set associated with the other data selection is not stored in the storage device, 3) creating the data-selection-specific fingerprint set associated with the other data selection, and 4) storing the data-selection-specific fingerprint set associated with the other data selection to the storage device. In addition, the method may further comprise: 1) detecting a subsequent request to store the other data selection to the single-instance-storage computing subsystem, 2) identifying the data-selection-specific fingerprint set associated with the other data selection and stored on the storage device, and 3) utilizing the data-selection-specific fingerprint set associated with the other data selection for data deduplication associated with the subsequent request to store the other data selection to the single-instance-storage computing subsystem.

In at least one example, the data selection and the other data selection may comprise separate logical data sets stored on the storage device. In at least one other example, the data selection comprises a first user-defined logical data set stored on the storage device and marked for backup to the single-instance-storage computing subsystem, and the other data selection comprises a second user-defined logical data set stored on the storage device and marked for backup to the single-instance-storage computing subsystem.

In some examples, utilizing the data-selection-specific fingerprint set associated with the data selection for data deduplication associated with the request to store the data selection to the single-instance-storage computing subsystem may comprise: 1) initializing the data-selection-specific fingerprint set associated with the data selection in a cache and 2) utilizing the cached data-selection-specific fingerprint set associated with the data selection for data deduplication associated with the request to store the data selection to the single-instance-storage computing subsystem.

In some examples, the data-selection-specific fingerprint set associated with the data selection represents a most recent backup of the data selection to the single-instance-storage computing subsystem. In other examples, the data-selection-specific fingerprint set associated with the data selection may include fingerprints that are based on one or more previous backups (e.g., a certain number of the most recent backups). In other examples, the data-selection-specific fingerprint set associated with the data selection may include fingerprints that are based on one or more suitable criteria, including a most recent backup of the data selection, one or more previous backups of the data selection, or any other criterion or combination of criteria as may suit a particular implementation.

In some examples, the method may also comprise maintaining a plurality of data-selection-specific fingerprint sets associated with a plurality of separate data selections in the storage device, in which each of the data-selection-specific fingerprint sets is associated with a different one of the separate data selections, and in which identifying the data-selection-specific fingerprint set associated with the data selection comprises identifying the data-selection-specific fingerprint set associated with the data selection from the plurality of data-selection-specific fingerprint sets associated with the plurality of separate data selections in the storage device.

In at least one example, a system for data-selection-specific data deduplication may comprise: at least one processor and a duplication client that directs the at least one processor to: 1) maintain a plurality of data-selection-specific fingerprint sets on a storage device, 2) detect a request to store a data selection to a single-instance-storage computing subsystem, 3) identify a data-selection-specific fingerprint set associated with the data selection from the plurality of data-selection-specific fingerprint sets stored on the storage device, and 4) utilize the data-selection-specific fingerprint set associated with the data selection for data deduplication associated with the request to store the data selection to the single-instance-storage computing subsystem.

In at least one example, a computer-readable-storage medium comprises one or more computer-executable instructions that, when executed by a computing device, cause the computing device to: 1) maintain a plurality of data-selection-specific fingerprint sets associated with a plurality of data selections on a storage device, 2) detect a request to store one of the data selections to a single-instance-storage computing subsystem, 3) identify a data-selection-specific fingerprint set associated with the one of the data selections from the plurality of data-selection-specific fingerprint sets stored on the storage device, and 4) utilize the data-selection-specific fingerprint set associated with the one of the data selections for data deduplication associated with the request to store the data selection to the single-instance-storage computing subsystem.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature at least because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for data-selection-specific data deduplication, at least a portion of the method being performed by a client-side computing device comprising at least one processor, the method comprising:
    detecting, at the client-side computing device, a request to store a data selection to a single-instance-storage server configured to store single instances of multiply-referenced data, wherein the data selection comprises a plurality of data segments and represents both:
        a subset of all data stored on a storage device of the client-side computing device;
        a subset of all data stored to the single-instance-storage server;
    identifying a data-selection-specific fingerprint cache associated with the data selection, wherein:
        the data-selection-specific fingerprint cache is stored on the storage device of the client-side computing device;
        the data-selection-specific fingerprint cache only includes fingerprints for the plurality of data segments within the data selection such that the data-selection-specific fingerprint cache only includes fingerprints for the subset of data stored on the storage device of the client-side computing device;
    utilizing the data-selection-specific fingerprint cache when performing a data deduplication operation at the client-side computing device in connection with the request to store the data selection to the single-instance-storage server by:
        identifying, by analyzing the data-selection-specific fingerprint cache stored on the storage device of the client-side computing device, at least one data segment within the data selection that has already been stored on the single-instance-storage server;
        refraining from transmitting the data segment to the single-instance-storage server.

2. The method of claim 1, further comprising:
    identifying, by analyzing the data-selection-specific fingerprint cache stored on the storage device of the client-side computing device, at least one new data segment within the data selection that has not been stored on the single-instance-storage server;
    transmitting the new data segment to the single-instance-storage server for storage;
    updating the data-selection-specific fingerprint cache stored on the storage device of the client-side computing device to include at least one new fingerprint representing the new data segment.

3. The method of claim 2, further comprising:
    detecting a subsequent request to store the data selection to the single-instance-storage server;
    identifying the updated data-selection-specific fingerprint cache stored on the storage device of the client-side computing device;
    utilizing the updated data-selection-specific fingerprint cache when performing a data deduplication operation in connection with the subsequent request to store the data selection to the single-instance-storage server.

4. The method of claim 1, further comprising:
    detecting a request to store another data selection that comprises a plurality of data segments to the single-instance-storage server, wherein at least a portion of the plurality of data segments within the other data selection differ from the plurality of data segments within the data selection;
    identifying another data-selection-specific fingerprint cache associated with the other data selection, wherein the other data-selection-specific fingerprint cache is stored on the storage device of the client-side computing device and only includes fingerprints for the plurality of data segments within the other data selection;
    utilizing the other data-selection-specific fingerprint cache when performing a data deduplication operation in connection with the request to store the other data selection to the single-instance-storage server.

5. The method of claim 1, further comprising:
    detecting a request to store another data selection that comprises a plurality of data segments to the single-instance-storage server;
    determining that a data-selection-specific fingerprint cache associated with the other data selection is not stored on the storage device of the client-side computing device;
    creating the data-selection-specific fingerprint cache associated with the other data selection, wherein the data-selection-specific fingerprint cache associated with the other data selection only includes fingerprints for the plurality of data segments within the other data selection;
    storing the data-selection-specific fingerprint cache associated with the other data selection to the storage device of the client-side computing device.

6. The method of claim 5, further comprising:
    detecting a subsequent request to store the other data selection to the single-instance-storage server;
    identifying the data-selection-specific fingerprint cache associated with the other data selection;
    utilizing the data-selection-specific fingerprint cache associated with the other data selection when performing a data deduplication operation in connection with the subsequent request to store the other data selection to the single-instance-storage server.

7. The method of claim 5, wherein the data selection and the other data selection comprise separate logical data sets stored on the storage device.

8. The method of claim 5, wherein:
    the data selection comprises a first user-defined logical data set stored on the storage device and marked for backup to the single-instance-storage server;
    the other data selection comprises a second user-defined logical data set stored on the storage device and marked for backup to the single-instance-storage server.

9. The method of claim 1, wherein identifying the data-selection-specific fingerprint cache comprises initializing the data-selection-specific fingerprint cache.

10. The method of claim 1, wherein the data-selection-specific fingerprint cache represents a most recent backup of the data selection to the single-instance-storage server.

11. The method of claim 1, further comprising:
    maintaining a plurality of data-selection-specific fingerprint caches associated with a plurality of separate data selections in the storage device of the client-side computing device, wherein:

at least a portion of each of the plurality of separate data selections differs from all other data selections within the plurality of separate data selections;

each of the data-selection-specific fingerprint caches is associated with a different one of the plurality of separate data selections;

wherein identifying the data-selection-specific fingerprint cache associated with the data selection comprises identifying the data-selection-specific fingerprint cache associated with the data selection from within the plurality of data-selection-specific fingerprint caches associated with the plurality of separate data selections in the storage device of the client-side computing device.

12. A system for data-selection-specific data deduplication, the system comprising:

at least one processor of a client-side computing device;

a deduplication client that directs the processor of the client-side computing device to:

maintain a plurality of data-selection-specific fingerprint caches on a storage device of the client-side computing device;

detect a request to store a data selection to a single-instance-storage server configured to store single instances of multiply-referenced data, wherein the data selection comprises a plurality of data segments and represents both:

a subset of all data stored on the storage device of the client-side computing device;

a subset of all data stored to the single-instance-storage server;

identify a data-selection-specific fingerprint cache associated with the data selection from within the plurality of data-selection-specific fingerprint caches stored on the storage device of the client-side computing device, wherein the data-selection-specific fingerprint cache only includes fingerprints for the plurality of data segments within the data selection such that the data-selection-specific fingerprint cache only includes fingerprints for the subset of data stored on the storage device of the client-side computing device;

utilize the data-selection-specific fingerprint cache when performing a data deduplication operation at the client-side computing device in connection with the request to store the data selection to the single-instance-storage server by:

identifying, by analyzing the data-selection-specific fingerprint cache stored on the storage device of the client-side computing device, at least one data segment within the data selection that has already been stored on the single-instance-storage server;

refraining from transmitting the data segment to the single-instance-storage server.

13. The system of claim 12, wherein the deduplication client further directs the processor of the client-side computing device to:

identify, by analyzing the data-selection-specific fingerprint cache stored on the storage device of the client-side computing device, at least one new data segment within the data selection that has not been stored on the single-instance-storage server;

transmit the new data segment to the single-instance-storage server for storage;

update the data-selection-specific fingerprint cache stored on the storage device of the client-side computing device to include at least one new fingerprint representing the new data segment;

detect a subsequent request to store the data selection to the single-instance-storage server;

identify the updated data-selection-specific fingerprint cache stored on the storage device of the client-side computing device;

utilize the updated data-selection-specific fingerprint cache when performing a data deduplication operation in connection with the subsequent request to store the data selection to the single-instance-storage server.

14. The system of claim 12, wherein the deduplication client further directs the processor of the client-side computing device to:

detect a request to store another data selection that comprises a plurality of data segments to the single-instance-storage server, wherein at least a portion of the plurality of data segments within the other data selection differ from the plurality of data segments within the data selection;

identify another data-selection-specific fingerprint cache associated with the other data selection from within the plurality of data-selection-specific fingerprint caches stored on the storage device of the client-side computing device, wherein the other data-selection-specific fingerprint cache only includes fingerprints for the plurality of data segments within the other data selection;

utilize the other data-selection-specific fingerprint cache when performing a data deduplication operation in connection with the request to store the other data selection to the single-instance-storage server.

15. The system of claim 14, wherein the data selection and the other data selection comprise separate logical data sets stored on the storage device.

16. The system of claim 14, wherein:

the data selection comprises a first user-defined logical data set stored on the storage device and marked for backup to the single-instance-storage server;

the other data selection comprises a second user-defined logical data set stored on the storage device and marked for backup to the single-instance-storage server.

17. The system of claim 12, wherein the data-selection-specific fingerprint cache represents a most recent backup of the data selection to the single-instance-storage server.

18. A non-transitory computer-readable-storage medium comprising one or more computer-executable instructions that, when executed by a client-side computing device comprising at least one processor, cause the client-side computing device to:

maintain a plurality of data-selection-specific fingerprint caches associated with a plurality of data selections on a storage device of the client-side computing device;

detect, at the client-side computing device, a request to store one of the data selections to a single-instance-storage server configured to store single instances of multiply-referenced data, wherein the data selection comprises a plurality of data segments and represents both:

a subset of all data stored on the storage device of the client-side computing device;

a subset of all data stored to the single-instance-storage server;

identify a data-selection-specific fingerprint cache associated with the data selection from within the plurality of data-selection-specific fingerprint caches stored on the storage device of the client-side computing device, wherein the data-selection-specific fingerprint cache only includes fingerprints for the plurality of data segments within the data selection such that the data-selection-specific fingerprint cache only includes fingerprints for the subset of data stored on the storage device of the client-side computing device;

utilize the data-selection-specific fingerprint cache when performing a data deduplication operation at the client-side computing device in connection with the request to store the data selection to the single-instance-storage server by:

identifying, by analyzing the data-selection-specific fingerprint cache stored on the storage device of the client-side computing device, at least one data segment within the data selection that has already been stored on the single-instance-storage server;

refraining from transmitting the data segment to the single-instance-storage server.

19. The non-transitory computer-readable-storage medium of claim 18, wherein the plurality of data selections comprises:

a first data selection comprising a first user-defined logical data set stored on the storage device and marked for backup to the single-instance-storage server;

a second data selection comprising a second user-defined logical data set stored on the storage device and marked for backup to the single-instance-storage server.

* * * * *